United States Patent

[11] 3,590,577

| [72] | Inventor | Robert C. Utter |
| | | Indianapolis, Ind. |
| [21] | Appl. No. | 875,424 |
| [22] | Filed | Nov. 10, 1969 |
| [45] | Patented | July 6, 1971 |
| [73] | Assignee | General Motors Corporation |
| | | Detroit, Mich. |

[54] TRANSMISSION CREEP SPEED CONTROL VALVE
6 Claims, 1 Drawing Fig.

| [52] | U.S. Cl. | 60/19 |
| [51] | Int. Cl. | F02b 41/00 |
| [50] | Field of Search | 74/865, 867; 60/19 |

[56] References Cited
UNITED STATES PATENTS

| 3,003,309 | 10/1961 | Bowers et al. | 60/19 |
| 3,302,390 | 2/1967 | Christonson et al. | 60/19 |
| 3,371,479 | 3/1968 | Yapp et al. | 60/19 |

Primary Examiner—Arthur T. McKeon
Attorneys—W. E. Finken, A. M. Heiter and D. F. Scherer ABSTRACT: A hydraulic system for controlling the amount of creep in a hydrostatic or hydromechanical transmission including the directional valve is herein described. The directional valve is mechanically connected to the servocontrol of the transmission pump such that in low, forward or reverse drive range, at zero throttle setting, a control signal is passed through the directional valve to the actuator of the servocontrol to cause the servo to adjust the pump displacement to a predetermined value, thus establishing a drive ratio in the transmission. When the throttle is depressed and the pump displacement is increased by the control signal, the porting of the directional valve progressively opens calibrated restrictions to limit the rate at which the actuator can return to the creep position when the throttle is returned to the zero or idle position.

PATENTED JUL 6 1971
3,590,577
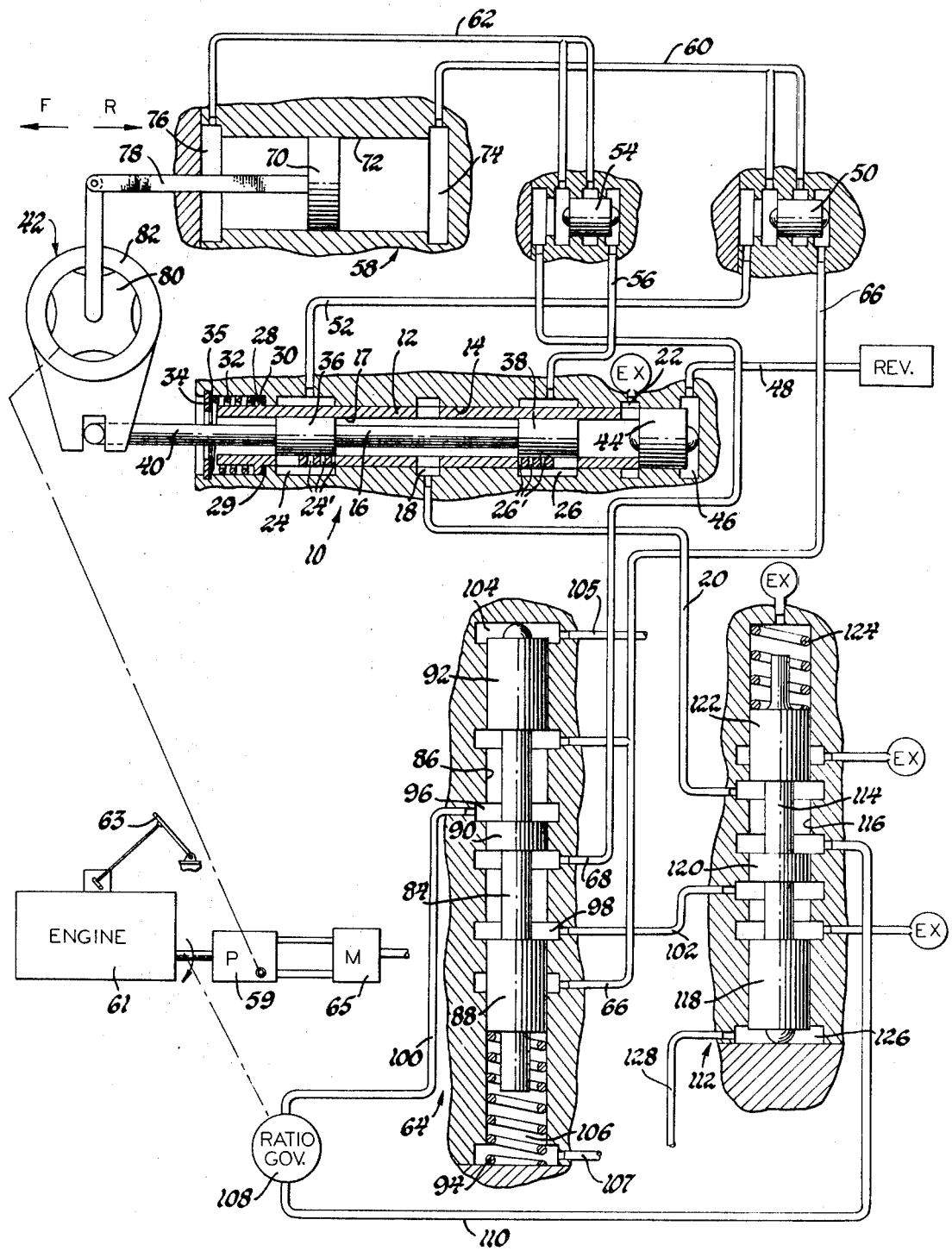
INVENTOR.
Robert Clinton Utter
BY
Donald F. Scherer
ATTORNEY

TRANSMISSION CREEP SPEED CONTROL VALVE

The invention herein described was made in the course of work under a contract or subcontract thereunder with the Department of the Army.

This invention relates to hydraulic control systems for transmissions and more particularly to control systems providing a creep control for throttle-controlled engine driven hydraulic transmissions.

Hydrostatic or hydromechanical transmissions which include a positive displacement pump and motor are normally controlled by a servocontrol mechanism that increases and decreases the pump displacement in response to control signals from a ratio governor. When the transmission is operating in the low forward or reverse drive at zero engine throttle, the pump displacement is theoretically set at zero so that no drive will occur. However, due to mechanical hysteresis and tolerances in the servo linkage, the zero throttle drive position is difficult to achieve. Therefore, there may be some creep value in the transmission at this drive condition in the normal control system having mechanical servo linkages. This creep value can be either a forward or reverse creep, independent of the drive direction selected by the operator.

The present invention provides valving associated with the servocontrol and responsive thereto to introduce a predetermined amount of pump displacement in the forward direction during forward drive and in the reverse direction during reverse operation in the low range at zero engine throttle setting, thus providing a predetermined creep. The control valve is essentially a four-way valve receiving a control signal from a ratio governor and directing that signal to the servo actuator. When the signal is directed to the servo actuator, the servo valve will respond to that signal and the output of the servo will move to cause the directional valve to discontinue the signal through the actuator when the predetermined creep value has been achieved. The directional valve is constructed such that by shimming a portion of the valve in one direction or another, the amount of creep is controlled. The valve is also constructed such that the forward creep value is controlled independently of the reverse creep value.

It is therefore an object of this invention to provide in an improved hydraulic control, a creep control valve that will be responsive to a transmission servocontrol to provide a determined amount of creep in the transmission.

It is another object of this invention to provide in a transmission control system a creep control valve which is movable in response to the transmission control signal to provide a forward creep value and a reverse creep value which may or may not be equal.

Another object of this invention is to provide in an improved transmission a creep control valve that will provide a predetermined creep value and will restrict the flow of fluid to the servocontrol as the drive ratio is reduced toward the predetermined creep value.

These and other objects and advantages of the present invention will be more apparent from the following description and drawings in which is shown a creep control valve in a hydraulic control system.

Referring to the drawing, there is shown a creep control or position indicator valve 10 having an outer sleeve member 12 slidably disposed in a valve bore 14 and a spool valve member 16 slidably disposed in a bore 17 of the sleeve 12. The sleeve 12 has a low return port 18 connected to a low return passage 20, an exhaust port 22, a reverse return port 24 and a forward return port 26. The sleeve 12 also has a shoulder portion 28 urged into abutment with a shoulder 30 of the bore 14 by a compression spring 32 held in compression between the shoulder 28 and a lock ring 34 secured in the bore 14. Shims 29 and 35 are positioned adjacent the shoulder 28 and the lock ring 34 respectively. The spool valve 16 has a pair of spaced equal diameter lands 36 and 38 and a rod extension 40 mechanically connected to a conventional rotary servocontrol 42. The distance between the lands 36 and 38 is equal to the distance between the ports 24 and 26. The creep control valve 10 also has a reverse plug 44 slidably disposed in the bore 14, adjacent the sleeve 12, opposite the spring 32. A reverse chamber 46 is located between the end of bore 14 and the reverse plug 44, which chamber 46 is connected to a reverse passage 48. Whenever the reverse drive in the transmission is actuated, the passage 48 will be pressurized so that the plug 44 will move the sleeve 12 to the left against the spring 32 until the end of sleeve 12 abuts the shim 35.

The servocontrol 42 controls the displacement of a variable displacement hydraulic pump 59 which is driven by an engine 61 controlled by a throttle 63. The pump 59 is hydraulically connected with a hydraulic motor 65 that is adapted to drive the vehicle output separately or in combination with a mechanical transmission.

The reverse low return port 24 is connected to a shuttle valve 50 via a reverse low return passage 52. The forward low return port 26 is connected to a shuttle valve 54 via a forward low return passage 56. The shuttle valve 50 and 54 are connected to a servo actuator 58 via passages 60 and 62 respectively. The shuttle valve 50 is also connected to an actuator valve 64 via passage 66 while the shuttle valve 54 is connected to the actuator valve 54 via passage 68.

The actuator 58 includes a piston 70 slidably disposed in a bore 72 so as to form a forward advance chamber 74 and a reverse advance chamber 76. The piston 70 has a rod 78 connected mechanically to the servocontrol 42 such that as the piston 70 is moved, the input portion 80 of the servo 42 is moved thus inducing a change in pump displacement and thereby causing movement of output portion 82 of the servocontrol 42 which is connected to the spool valve 16 so that the valve spool 16 moves also.

The actuator valve 64 has a valve spool 84, slidably disposed in a bore 86, having three equal diameter spaced lands 88, 90 and 92. The spool 84 is urged to one end of the bore 86 by a compression spring 94. The valve bore 86 is connected with the passages 66 and 68 and has an advance port 96 and a return port 98. An advance passage 100 and a return passage 102 are connected to the ports 96 and 98 respectively. The valve bore 86 has two control chambers 104 and 106 at the ends of the valve spool 84. When a control signal is introduced in chamber 106 via passage 107, the actuator valve 64 will be in the position shown thereby connecting a return passage 102 to the passage 68 and the advance passage 100 to the passage 66. When a control signal is present in the chamber 104 via passage 105 and no signal is present in the chamber 106, the valve spool 84 will be shifted against the spring 94 thereby connecting the advance passage 100 with passage 68 and a return passage 102 with the passage 66.

The advance passage 100 is connected to a ratio governor 108 which is a conventional ratio governor such as that shown in Ser. No. 709,007, now U.S. Pat. No. 3,475,903 filed Feb. 28, 1968. The ratio governor is an engine driven device which emits advance and return signals depending upon engine speed and throttle setting. The ratio governor 108 also has a return output line 110 which is connected to a spool valve 112.

The spool valve 112 has a valve spool 114 slidably disposed in a valve bore 116 and has three equal diameter spaced lands 118, 120 and 122. A compression spring 124 is held between one end of bore 116 and the spool valve 114 to urge the spool valve 112 to the position shown. The valve bore 116 is connected to passage 20 between lands 120 and 122 and to passage 102 between lands 118 and 120. In the position shown, the space between lands 118 and 120 is connected to exhaust while the space between lands 120 and 122 is connected to the return passage 110. Thus in the position shown, a return signal from the ratio governor 108 passes through the spool valve 112 to the passage 20 and then to the control valve 10. The valve 112 also has a control chamber 126 at the end of the valve spool 114 opposite the spring 124 such that when a control signal is present in chamber 126, the valve spool 114 will move upward in the bore 116 thereby connecting passage 102 to the return passage 110 and connecting passage 20 to exhaust. The chamber 126 receives a control signal through a passage 128 whenever the transmission is operating in a drive range other than low. Thus whenever the transmission is conditioned for low drive, the valve 112 will be in the position shown and the ratio governor return signal will be connected to the creep control valve 10. Whenever the transmission is in a drive range other than low, the return signal 110 will be connected to one or the other of the shuttle valves 50 or 54 to provide automatic ratio control bypassing the creep control valve 10.

The forward creep value is controlled by removing some of the shims 29 between the shoulder 28 and the shoulder 30. Removal of shims permits the sleeve 12 to be moved by the spring 32 to the right thereby opening the reverse return port 24 between lands 36 and 38 to the passage 20. When the engine is at idle, the passage 20 will have a return signal available which will then pass through the creep control valve 10 to passage 52 and the passage 60 to the chamber 74. Pressure in the chamber 74 will cause the piston 70 to move to the left thereby causing the servo 42 to change the pump displacement which will then be fed back to the valve spool 16 causing the spool to move to the right until the port 24 is closed by the land 36 thereby setting the pump displacement at some positive value which will induce a positive creep value into the transmission. To adjust the reverse creep value some of the shims 35, between the spring 32 and the lock ring 34, are removed so that when a reverse signal is present in chamber 46, the reverse plug 44 will move the sleeve 14 to the left thereby closing port 24 and opening port 26 a predetermined amount to the passage 20 between lands 36 and 38. Also in low reverse the chamber 104 will be pressurized, moving the spool 86 downward against spring 94 to connect advance passage 100 with passage 68. Again at idle, a return signal is present which passes through the creep control valve 10 to passage 56 and then to passage 62 to shuttle valve 54 where it is introduced to chamber 76 and acts on the piston 70 to move the piston to the right. This piston movement causes the servocontrol to adjust the pump displacement in a reverse direction which pump displacement adjustment is fed back through the valve spool 16 to cause the land 38 to close port 26 when the desired creep value has been achieved.

In the low range, as the accelerator is depressed, the ratio governor 108 will develop an advance signal which will pass through the actuator valve 64, passage 66, shuttle valve 50 and passage 60 to the advance chamber 74 thereby causing further movement of the piston 70 which will result in increased displacement of the hydraulic pump in response to the motion of the servo 42. The motion of the servo 42 is fed back through the valve spool 16 to cause the valve spool 16 to move to the right so that the port 26 is open to the passage 20 in increasing amounts as the pump displacement increases. The port 26 has a plurality of restricted openings 26' which restrict the fluid passage through the port 26. These restrictions are placed in the port 26 such that if the throttle pedal is returned to the idle position, the return signal for the actuator 58 will provide initial rapid return of the pump displacement towards the creep position. However, as the pump displacement approaches the creep position, the restrictions 26' will restrict the flow to the actuator 58 thereby controlling the rate of return of the pump displacement as the creep position is approached.

The port 24 also has a plurality of restrictions 24' which provide the same control function in reverse when the pump displacement is returned from some positive drive displacement to the creep position.

Obviously many modifications and variations will become apparent to those skilled in the art. Therefore, the above descriptions and drawings are not intended as limitations but as a description of the preferred embodiment of the invention.

What I claim is:

1. A control system for use with a throttle-controlled engine driven hydraulic transmission operable in a forward and reverse drive ratio and having a servo-controlled variable displacement pump, said control system including ratio governor means for generating an advance signal and a return signal; creep control means operatively connected with the servocontrol including valve means having an inlet, a forward outlet in fluid communication with said servocontrol, a reverse outlet in fluid communication with said servocontrol, and valve spool means for operatively and individually connecting said inlet with said outlets; and means for connecting the return signal with said inlet when the transmission is in the low forward or reverse drive ratio, whereby the return signal will be directed to said servocontrol by said creep control means to establish a predetermined amount of creep in said transmission.

2. A control system for use with a throttle-controlled engine driven hydraulic transmission operable in a plurality of forward and reverse drive ratios and having a servo-controlled variable displacement pump, said control system including ratio governor means for providing an advance signal and a return signal; creep control means operatively connected with the servocontrol including valve means having a sleeve member with an inlet, a forward outlet in fluid communication with said servocontrol, a reverse outlet in fluid communication with said servocontrol, and valve spool means slidably disposed in said sleeve member for operatively and individually connecting said inlet with said outlets; and means for connecting the return signal with said inlet when the transmission is in the low forward or reverse drive ratio, whereby the return signal will be directed to said servocontrol by said creep control means to establish a predetermined amount of creep in said transmission.

3. A control system for use with a throttle-controlled engine driven hydraulic transmission operable in a plurality of forward and reverse drive ratios and having a servocontrol variable displacement pump, said control system including ratio governor means for providing an advance signal and a return signal; creep control means operatively connected with the servocontrol including valve means having a sleeve member with an inlet, a forward outlet in fluid communication with said servocontrol, a reverse outlet in fluid communication with said servocontrol and being moveable to a forward and a reverse position, valve spool means for operatively and individually connecting said inlet with said outlets, spring means for moving said sleeve member to the forward position to connect said inlet with said forward outlet, and reverse plug means selectively operable for moving said sleeve member to said reverse position to connect said inlet with said reverse outlet; and means for connecting the return signal with said inlet when the transmission is in the low forward or reverse drive ratio, whereby the return signal will be directed to said servocontrol by said creep control means to establish a predetermined amount of creep in said transmission in the forward direction when said spring means is operable and in the reverse direction when said reverse plug means is operable.

4. A control system for use with a throttle-controlled engine driven hydraulic transmission operable in a plurality of forward and reverse drive ratios and having a servocontrol variable displacement pump, said control system including ratio governor means for providing an advance signal and a return signal; creep control valve means operatively connected with the servo control including a valve bore having an inlet port, a forward outlet port in fluid communication with said servocontrol, a reverse outlet port in fluid communication with said servocontrol, a sleeve member slidably disposed in said valve bore and having ports aligned with said ports in said valve bore, and valve spool means slidably disposed in said sleeve member having a pair of spaced lands for operatively and individually connecting said inlet port with said outlet ports; and means for connecting the return signal with said inlet when the transmission is in the low forward or reverse drive ratio, whereby the return signal will be directed to said servocontrol by said creep control means to establish a predetermined amount of creep in said transmission.

5. A control system for use with a throttle-controlled engine driven hydraulic transmission operable in a plurality of forward and reverse drive ratios and having a servo-controlled variable displacement pump, said control system including ratio governor means for providing an advance signal and a return signal; creep control valve means operatively connected with the servocontrol including a valve bore having an inlet port, a forward outlet port in fluid communication with said servocontrol, a reverse outlet port in fluid communication with said servocontrol, a sleeve member slidably disposed in said valve bore and having an inlet aligned with said inlet port, a forward port having a plurality of restrictions therein aligned with said forward outlet port, and a reverse port having a plurality of restrictions therein aligned with said reverse outlet port, aligned with said ports in said valve bore, and valve spool means slidably disposed in said sleeve member having a pair of spaced lands for operatively and individually connecting said inlet port with said outlet ports; and means for connecting the return signal with said inlet when the transmission is in the low forward or reverse drive ratio, whereby the return signal will be directed to said servocontrol by said creep control means to establish a predetermined amount of creep in said transmission and said restrictions will control the flow of fluid to the servo as the drive ratio of the transmission is reduced toward the predetermined creep value.

6. A control system for use with a throttle-controlled engine driven hydraulic transmission operable in a low drive ratio and having a servo-controlled variable displacement pump, said control system including ratio governor means for generating an advance signal and a return signal; creep control means operatively connected with the servocontrol including valve means having an inlet port, an outlet port in fluid communication with said servocontrol, and valve spool means for operatively connecting said inlet port with said outlet port; and means for connecting the return signal with said inlet when the transmission is in the low drive ratio, whereby the return signal will be directed to said servocontrol by said creep control means to establish a predetermined amount of creep in said transmission.